United States Patent [19]
Yamamoto et al.

[11] Patent Number: 6,030,912
[45] Date of Patent: Feb. 29, 2000

[54] SINTERED HARD MATERIAL

[75] Inventors: Tsutomu Yamamoto, Kobe; Kazuhiro Tezuka, Ikeda, both of Japan

[73] Assignee: Dijet Industrial Co., Ltd., Osaka, Japan

[21] Appl. No.: 09/012,576

[22] Filed: Jan. 23, 1998

[51] Int. Cl.[7] .................................................. C04B 35/56
[52] U.S. Cl. ................................ 501/87; 501/91; 501/92; 501/93; 75/236; 75/240; 75/242
[58] Field of Search .................. 501/87, 91, 92, 501/93; 75/236, 240, 242

[56] References Cited

U.S. PATENT DOCUMENTS

| | | |
|---|---|---|
| 3,480,410 | 11/1969 | Hummer . |
| 4,945,073 | 7/1990 | Dubensky et al. .......................... 501/93 |
| 5,089,447 | 2/1992 | Timm et al. ................................ 501/87 |
| 5,288,676 | 2/1994 | Shimada et al. ............................ 501/93 |
| 5,880,382 | 3/1999 | Fang et al. ................................. 75/236 |

FOREIGN PATENT DOCUMENTS

| | | |
|---|---|---|
| 0360567 | 3/1990 | European Pat. Off. . |
| 3-505862 | 12/1991 | Japan . |
| 04365558 | 12/1992 | Japan . |
| 5-209248 | 8/1993 | Japan . |
| 05230588 | 9/1993 | Japan . |
| PCT/US89/ 04080 | 4/1990 | WIPO . |
| WO90/03348 | 4/1990 | WIPO . |

OTHER PUBLICATIONS

PCT/US89/04080 WO90/03348 (Japan Publication No. 3–505862).

*Primary Examiner*—Paul Marcantoni
*Attorney, Agent, or Firm*—Armstrong, Westerman, Hattori, McLeland, & Naughton

[57] ABSTRACT

A sintered hard material according to the invention comprises 0.02 to 0.10 wt % of one or more metals selected from the group consisting of Fe, Co and Ni, 0.3 to 3.0 wt % of one or more compounds selected from the group consisting of carbides, nitrides and carbonitrides of transition metals of the IVa, Va and VIa groups of the periodic table and a residue of tungsten carbide component having an average particle size of 0.5 μm or less, the tungsten carbide component containing WC and $W_2C$ in a proportion $W_2C/(WC+W_2C)$ of between 0.01 and 0.15, the $W_2C$ in the tungsten carbide component having a lattice constant reduced by 0.3 to 1.5 %.

8 Claims, 2 Drawing Sheets

SINTERED HARD MATERIAL

BACKGROUND OF THE INVENTION

1. Field of the Invention

The present invention generally relates to a sintered, hard material featuring a high degree of hardness and wear resistance, such as sliding-wear resistance, abrasive resistance and erosion resistance, and more particularly to a sintered, hard material of high hardness suitable for use in a variety of wear resistant tools, such as waterjet cutting nozzles, draw dies, dies and the like, which require high degrees of hardness and the aforesaid wear resistance.

2. Description of the Related Art

As a sintered hard material for use in the aforesaid wear resistant tools, there have generally been employed sintered hard alloys comprising a hard material phase such as of WC, TiC, TiN, TiCN, TaC and the like, and 4 to 20 wt % of a binder phase of an iron group metal such as Co and the like, the hard material phase sintered with the binder phase.

The aforesaid sintered hard alloy containing 4 to 20 wt % of iron group metal, such as Co, as the binder phase provides high degrees of strength and tenacity but a Micro-Vickers hardness of only about less than 2200 kgf/mm$^2$ measured using a hundred gram load (hereinafter, simply referred to as "OMHv (0.1)"). Where such a sintered hard alloy is used as a material for forming wear resistant tools requiring high degrees of wear resistance like waterjet cutting nozzles, a sufficient wear resistance for practical use cannot be attained.

In this connection, there have been proposed sintered hard materials directed to improvement in hardness by reducing a mixing ratio of the iron group metal serving as the binder phase. For instance, Japanese Unexamined Patent Publication No. 5(1993)-230588 has disclosed a sintered hard material accomplishing improvement in hardness by reducing the content of Co serving as the binder phase to 2 wt % or less and employing WC powder having an average particle size of 2 µm or less.

Unfortunately, the sintered hard material disclosed in this Patent Publication contains an amount of binder phase of a soft iron group metal and therefore, the hardness MHv(0.1) thereof is only increased to about 2700 kgf/m$^2$. Furthermore, the above hard material falls short of providing a practically sufficient wear resistance for forming the waterjet cutting nozzles and the like, although it is not known if such a drawback results from local small portions of low hardness remaining in the material.

On the other hand, there has been suggested a sintered hard material free from a metal binder phase or containing no iron group metal serving as the binder phase for the purpose of achieving a further increase in the hardness.

The elimination of the metal binder phase from the hard material leads to a likelihood of appearance of W$_2$C and free carbon (C) additionally to a WC phase, as indicated by a W-C phase diagram of Sara, Rudy, J. T. Norton, et al. This is because there exists no iron group metal serving to form a solid solution with excessive W and C. Hence, it is extremely difficult to produce a sintered material of a single WC phase in a stable manner. As a consequence, a sintered material of a WC+W$_2$C phase or a WC+C phase is obtained.

In the case of a sintered material of the WC+C phase, the sintered material is much reduced in the overall hardness due to an extremely low hardness of free carbon and hence, is far from serving for the purpose of forming the waterjet cutting nozzles or the like.

As to the sintered material free from the metal binder phase, study was also conducted on the sintered material of the WC+W$_2$C phase, as suggested by Japanese Unexamined Patent Publication Nos. 4(1992)-365558 and 5(1993)-209248.

Where no metal binder phase is employed, as described above, it is difficult to obtain a dense sintered material due to the absence of a liquid phase in the sintering process. The absence of the liquid phase also leads to direct contact between WC and W$_2$C particles which, in turn, form a solid phase bond therebetween and hence, local formation of coarse grains results. As a consequence, the overall hardness of a resultant sintered material is reduced.

The density of a sintered material may be increased to a degree by subjecting the ingredients to increased sintering temperatures and pressures. Under such conditions, however, the grain growth of tungsten carbide becomes excessive. Hence, despite the merit of the absence of a soft metal binder phase, the resultant sintered material as a whole has a lower hardness than expected. In addition, heavy wear may sometimes arise from pores remaining in the sintered material. As a result, the resultant sintered material cannot achieve a wear resistance stable enough for practical use.

In this connection, Japanese Unexamined Patent Publication No. 4(1992)-365558 teaches the addition of a carbide or nitride of Ti, Ta, V, Cr and the like for suppressing the grain growth of tungsten carbide while allowing for the reduction of the sintering temperature.

According to this method, the grain growth of WC in the tungsten carbide component is retarded to a degree but the grain growth of W$_2$C in the tungsten carbide component cannot be reduced to about as low as that of WC. Consequently, the resultant sintered material cannot attain an adequate improvement in the overall hardness, thus failing to achieve such a high hardness value MHv(0.1) of over 3000 kgf/mm$^2$.

SUMMARY OF THE INVENTION

The present invention is directed to overcome the aforementioned problems associated with the sintered material for use in waterjet cutting nozzles and the like.

It is therefore, an object of the invention to provide a sintered hard material suitable for use in waterjet cutting nozzles and the like and featuring a high degree of hardness unattainable from the conventional metal binder-free sintered material of the WC+W$_2$C phase as well as good wear resistance, such as sliding-wear resistance, abrasive resistance and erosion resistance, in particular.

For achieving the above object, the inventors conducted an intensive study on the sintered material of the WC+W$_2$C phase to find the following fact. That is, if WC and W$_2$C particles are heated at the same temperature for the same period of time, the grain growth of W$_2$C is faster than that of WC so that the overall hardness of a resultant sintered material is reduced.

Instead of eliminating the iron group metal constituting the metal binder phase, the inventors have examined a minimum amount of iron group metal and of carbide, nitride or carbonitride of transition metals of the IVa, Va and VIa groups of the periodic table, that is required for preventing the WC and W$_2$C particles from being in contact with each other to form a solid-phase bond therebetween. At the same time, the inventors have further examined an optimum content of W$_2$C in the tungsten carbide component and an optimum lattice constant of W$_2$C for controlling the excessive grain growth thereof. In this manner, the present invention has been accomplished.

In one aspect of the sintered hard material according to the invention comprises 0.02 to 0.10 wt % of one or more metals selected from the group consisting of Fe, Co and Ni, 0.3 to 3.0 wt % of one or more compounds selected from the group consisting of carbides, nitrides and carbonitrides of transition metals of the IVa, Va and VIa groups of the periodic table, and a residue of tungsten carbide having an average particle size of 0.5 µm or less, the tungsten carbide component containing WC and $W_2C$ in a proportion $W_2C/(WC+W_2C)$ of between 0.02 and 0.15.

In another aspect of the sintered hard material according to the invention comprises 0.02 to 0.10 wt % of one or more metals selected from the group consisting of Fe, Co and Ni, 0.3 to 3.0 wt % of one or more compounds selected from the group consisting of carbides, nitrides and carbonitrides of transition metals of the IVa, Va and VIa groups of the periodic table, and a residue of tungsten carbide having an average particle size of 0.5 µm or less, the tungsten carbide component containing $W_2C$ with its lattice constant reduced by 0.3 to 1.5 percent.

According to the invention, the sintered hard material contains 0.02 to 0.10 wt % of one or more metals selected from the group consisting of Fe, Co and Ni for the following reasons. If the content thereof is less than 0.02 wt %, an absolute amount of liquid phase is insufficient in the sintering process so that a sintered material of high density is unattainable while on the other hand, a portion of the WC and $W_2C$ particles is in direct contact with each other to be cemented or bonded with each other to produce local grain growth. As a consequence, the resultant sintered hard material is reduced in hardness. On the other hand, if the content thereof exceeds 0.10 wt %, WC as an essential component phase is dissolved in the liquid phase and precipitate to promote the grain growth thereof excessively while a content of the soft binder phase is excessive. As a consequence, the resultant sintered material is reduced in hardness. In adjustment of the content of the iron group metal such as Fe, Co and Ni within the aforesaid range, it is important to consider an amount of such powdered metal directly subjected to the mixing process as well as an amount thereof contained as impurities in other powder ingredients or inadvertent addition thereof during other processes like where, for instance, the powdered metal may be abraded from a mixing tank and balls and added to the ingredients being mixed by ball milling.

According to the invention, the sintered hard material contains one or more compounds selected from the group consisting of carbides, nitrides and carbonitrides of transition metals of the IVa, Va and VIa groups of the periodic table. The addition of a carbide, nitride and/or carbonitride of such metals provides similar effects to those offered by adding such compounds to the conventional hard sintered alloys, which effects include, for example, suppression of grain growth of tungsten carbide during the sintering process and improvement in wettability between the tungsten carbide particles and the binder phase of the iron group metal.

The content of such a carbide, nitride and/or carbonitride is limited in the range of between 0.3 and 3.0 wt % for the following reasons. A content below this range does not offer sufficient effects of the above whereas a content over this range leads to a reduced hardness of a resultant sintered hard material.

Among the carbides, nitrides and carbonitrides of the transition metals of the IVa, Va and VIa groups of the periodic table, chromium carbide, in particular, may be preferably added to provide adequate suppression of the grain growth of tungsten carbide as well as improvement in the corrosion resistance of a resultant sintered hard material.

If an insufficient amount of chromium carbide is added, the foregoing effects cannot be obtained whereas the addition of an excessive amount thereof results in a lowered sinterability so that a resultant sintered hard material does not offer desired physical properties. Accordingly, the content of chromium carbide is preferably in the range of between 0.6 and 2.0 wt %.

The sintered hard material of the invention contains WC as well as $W_2C$, as the tungsten carbide component, because a small amount of iron group metal like Fe, Co and Ni is contained therein. According to the invention, the tungsten carbide component contains WC and $W_2C$ in a proportion $W_2C/(WC+W_2C)$ of between 0.01 and 0.15.

The proportional value of $W_2C/(WC+W_2C)$ is limited within the above range of between 0.01 and 0.15 for the following reasons. A proportional value of below 0.01 leads to an increasing tendency of free carbon to appear and hence, a resultant sintered hard material is seriously reduced in hardness. On the other hand, a proportional value of over 0.15 does not provide a minimum reduction of $W_2C$ lattice constant that is required for suppressing the grain growth of $W_2C$ but permits $W_2C$ particles to grow much faster than WC particles when they are heated at an optimum temperature for an optimum period of time for giving a sintered hard material of high density. As a consequence, the overall hardness of a resultant sintered hard material is reduced.

In the sintered hard material of the invention, the aforesaid $W_2C$ lattice constant is reduced by 0.3 to 1.5% so as to retard the grain growth of $W_2C$. Although a specific mechanism of suppressing the grain growth of $W_2C$ has not been clarified so far, the inventors infer the following reasons from the study on the production mechanism of $W_2C$ where the tungsten carbide component is essentially comprised of WC.

As indicated by the W-C phase diagram, the production of $W_2C$ seems to occur when either an insufficient amount of carbon or an excessive amount of tungsten is present in the WC component which is a stoichiometric composition. A likely carbon-deficient state, for instance, may be caused by decarburization occurring in the sintering process, which is one of the causes of the production of η-phase ($Co_3W_3C$) observed in WC/Co-phase hard sintered alloys. Specifically, Co and $CO_2$ gasses are generated in the sintering process, thus liberating carbon from a sintered material. On the other hand, a tungsten-excessive state seems to be caused by addition of a tungsten metal performed as a general practice in the art when a high-carbon WC powder such as containing free carbon is used for producing a hard sintered alloy.

The production reactions of $W_2C$ are schematically expressed by way of reaction formulas of $3WC+(O)\rightarrow WC+W_2C+CO_o$ for the case of the decarburization during the sintering process and of $2WC+W\rightarrow WC+W_2C$ for the case of the addition of a tungsten metal.

In either of these cases, diffusion and movement of carbon, a light element, serve as a determining step for the production reaction of $W_2C$. More specifically, the production of $W_2C$ due to the decarburization seems to be effected by a portion of carbon of WC moving to oxygen whereas the production thereof due to the excessive content of tungsten seems to be effected by a portion of carbon of WC diffused and moved to tungsten.

In the progress of the reaction process, a portion of WC is thought to be first rendered into a metastable state of $WC_{1-x}$ (x is incremented from 0 to 0.5) and then finally into $W_2C$ rather than instantaneously converted into $W_2C$. That is, the production reaction of $W_2C$ proceeds in the steps of $WC \rightarrow WC_{1-x} \rightarrow W_2C$. In the case of the production of $W_2C$ due to addition of the tungsten metal, $W_2C$ is thought to be also formed from tungsten and therefore the production reaction of $W_2C$ seems to proceed in the steps of $W \rightarrow WC_x$ (x is incremented from 0 to 0.5) $\rightarrow W_2C$.

Considering that the WC lattice constant is a=2.9062, c=2.8378 (JCPDS Card 25-1047★) while the $W_2C$ lattice constant is a=2.99704, c=4.7279 (JCPDS Card 35-776 ★), the reduced $W_2C$ lattice constant seems to mean that the $W_2C$ in question has crystal structure and size closer to those of WC than those of $W_2C$ in normal state. More specifically, the $W_2C$ in question seems to have a configuration with excessive carbon atoms or with insufficient tungsten atoms, which is the same or close to the structure of the aforesaid $WC_{1-x}$ ($0 \leq x \leq 0.5$) or the structure of $W_2C_x$ ($1 \leq x < 2$).

It seems that the $W_2C$ having the aforementioned configuration is partially continuous to the lattice of WC thereby forming a stable state continuous to WC. Hence, in the sintered hard material of the invention, the grain growth of $W_2C$ contained therein in the aforementioned manner may be suppressed more than that of normal single phase $W_2C$ in proportion to an amount of interlattice strain energy. As a consequence, there is obtained a sintered hard material having a high degree of hardness.

If the $W_2C$ lattice constant is reduced by less than 0.3%, the effect of suppressing the grain growth of $W_2C$ is reduced. For achieving a high hardness in terms of MHv value (0.1) of at least 3150 $kgf/mm^2$, the reduction of $W_2C$ lattice constant is preferably in the range of between 0.5 and 1.1%.

The production of the sintered hard material of the invention may preferably be performed in vacuo or in a stream of an inert gas, such as nitrogen, argon and the like, at temperatures of between 1700 and 2100° C. by way of a method such as gas pressure sintering, hot isostatic process (HIP), hot pressing and the like. For attaining a sintered material having a highest degree of density, the hot pressing utilizing a pressure of between 300 and 500 $kgf/cm^2$ is particularly preferred. Incidentally, the sintering temperature is limited within the range of between 1700 and 2100° C. because temperatures of below 1700° C. do not offer a sintered material with high density whereas temperatures of over 2100° C. excessively promote the grain growth of WC and $W_2C$ so that a resultant sintered material is reduced in hardness.

According to the present invention, a sintered material featuring extremely high density and hardness can be attained by means of combinations of the aforementioned constituent features of the invention. Particularly preferred is a sintered hard material having a void volume of not more than 0.02 vol % or not less than A02 measured by ASTM method, and a hardness MHv(0.1), or a Micro-Vickers hardness of not less than 3000 $kgf/mm^2$ measured using a 100 gram load.

The void volume of the above sintered material is limited to 0.02 vol % or less because a void volume of over this range results in a decreased overall hardness of a resultant sintered hard material. If a tool is formed of such a hard material, a fear exists that heavy wear may start from a lower hardness portion of this hard material. On the other hand, a hardness value MHv(0.1) of less than 3000 $kgf/mm^2$ does not offer sufficient wear resistance, such as sliding-wear resistance, abrasive resistance and erosion resistance, in particular.

A sintered hard material having a void volume of not more than 0.02 vol % and a hardness MHv(0.1) of not less than 3000 $kgf/mm^2$ is suitably used and exhibits excellent performances in a variety of applications, such as waterjet cutting nozzles, draw dies, dies and the like, which require wear resistance including sliding-wear resistance, abrasive resistance and erosion resistance, in particular.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
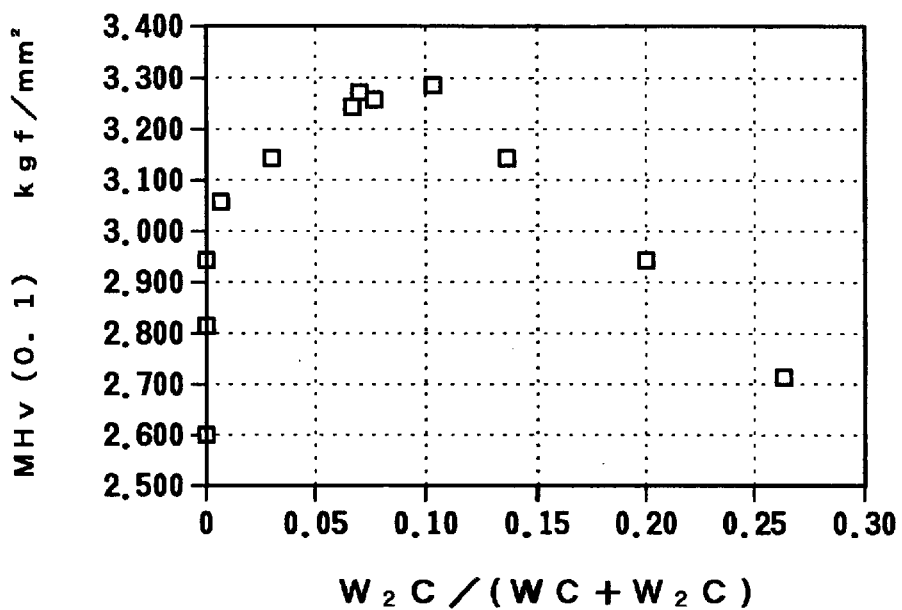
FIG. 1 is a graphical representation showing the relationship between $W_2C/(WC+W_2C)$ value and Micro-Vickers Hardness (MHv)

Detailed description will hereinbelow be made on sintered hard materials according to the preferred embodiments of the invention with reference to the operative examples thereof while comparison will be made with materials not satisfying the conditions of the invention for clarification of the merits of the sintered hard materials of the embodiments thereof.

(EXAMPLES 1 to 12)

In each of Examples 1 to 12, there were used as ingredients WC powder having an average particle size of 0.2 $\mu$m and containing carbon (C) as indicated in the following Table 1, W powder having an average particle size of 0.4 $\mu$m, carbon, and $Cr_3C_2$ and Co powders having an average particle size of between 1.0 and 1.5 $\mu$m. These ingredients were blended together in a ratio as indicated in Table 1 and mixed by ball milling using a stainless steel pot and balls formed of a hard material for a period of time of 16 to 72 hours. Subsequently, the resultant mixture was dried to give a powder mixture for each of these Examples.

TABLE 1

| | WC ingredients | | Composition wt % | | | | |
|---|---|---|---|---|---|---|---|
| Examples | Particle size $\mu$m | C content wt % | WC | W | C | $Cr_3C_2$ | Co |
| 1 | 0.2 | 6.25 | 98.53 | — | 0.44 | 1.00 | 0.03 |
| 2 | 0.2 | 6.25 | 98.66 | — | 0.31 | 1.00 | 0.03 |
| 3 | 0.2 | 6.25 | 98.78 | — | 0.19 | 1.00 | 0.03 |
| 4 | 0.2 | 6.25 | 98.82 | — | 0.15 | 1.00 | 0.03 |
| 5 | 0.2 | 6.25 | 98.86 | — | 0.11 | 1.00 | 0.03 |
| 6 | 0.2 | 6.25 | 98.97 | — | — | 1.00 | 0.03 |
| 7 | 0.2 | 6.25 | 96.91 | 2.06 | — | 1.00 | 0.03 |
| 8 | 0.2 | 6.25 | 95.01 | 3.96 | — | 1.00 | 0.03 |
| 9 | 0.2 | 6.25 | 92.95 | 6.02 | — | 1.00 | 0.03 |
| 10 | 0.2 | 5.73 | 98.97 | — | — | 1.00 | 0.03 |
| 11 | 0.2 | 5.73 | 98.43 | — | 0.54 | 1.00 | 0.03 |
| 12 | 0.2 | 6.21 | 98.97 | — | — | 1.00 | 0.03 |

Next, the resultant powder mixtures were each filled in a graphite mold and subjected to hot pressing under pressures of 300 to 500 $kgf/cm^2$ at elevated temperatures of 1700 to 2100° C. in an inert gas atmosphere so as to be sintered and formed into a sintered hard material part for each of these Examples.

The resultant parts formed of the above sintered hard materials were each ground and abraded, and then subjected to density measurement by means of Archemedean Method. On the other hand, a quantitative analysis was conducted for determination of contents of carbon and iron group elements (Co, Ni, Fe) in each of the sintered hard materials thereby finding contents of WC, $W_2C$, C, $Cr_3C_2$ and the iron group element in terms of wt % as well as a $W_2C/(WC+W_2C)$ value. The results are shown in the following Table 2.

TABLE 2

| Examples | Analysed composition wt % | | | | | $W_2C/$ (WC + $W_2C$) | Density g/cm³ |
|---|---|---|---|---|---|---|---|
| | WC | $W_2C$ | C | $Cr_3C_2$ | Iron group | | |
| 1 | 98.69 | — | 0.25 | 1.0 | 0.06 | 0.00 | 15.18 |
| 2 | 98.79 | — | 0.15 | 1.0 | 0.06 | 0.00 | 15.31 |
| 3 | 98.94 | — | — | 1.0 | 0.06 | 0.00 | 15.37 |
| 4 | 98.45 | 0.49 | — | 1.0 | 0.06 | 0.01 | 15.39 |
| 5 | 95.77 | 3.17 | — | 1.0 | 0.06 | 0.03 | 15.42 |
| 6 | 92.41 | 6.53 | — | 1.0 | 0.06 | 0.07 | 15.46 |
| 7 | 88.50 | 10.44 | — | 1.0 | 0.06 | 0.11 | 15.52 |
| 8 | 85.43 | 13.51 | — | 1.0 | 0.06 | 0.14 | 15.58 |
| 9 | 79.15 | 19.79 | — | 1.0 | 0.06 | 0.20 | 15.63 |
| 10 | 72.92 | 26.02 | — | 1.0 | 0.06 | 0.26 | 15.70 |
| 11 | 92.76 | 6.18 | — | 1.0 | 0.06 | 0.06 | 15.47 |
| 12 | 91.37 | 7.57 | — | 1.0 | 0.06 | 0.08 | 15.47 |

The foregoing sintered hard material parts were each observed under a light microscope for determination of void volume, and an electron microscope for determination of particle sizes of WC and $W_2C$ as well as subjected to x-ray diffraction analysis for determination of reduction rate of $W_2C$ lattice constant. For evaluations of Micro-Vickers 100 g Hardness MHv(0.1) and wear resistance of each of the sintered hard material parts, SiC abrasive grains were blast injected thereagainst under a pressure of 10 kgf/cm² for a period of time of 180 seconds so as to measure a volume loss. The results are shown in the following Table 3. In the aforesaid x-ray diffraction analysis, the measurement was performed using Cu target for specific determination of 20 of each crystal face of $W_2C$ whereby the lattice constant for each $W_2C$ was calculated.

TABLE 3

| Examples | Void volume vol % | Particle size μm | | Reduction rate of lattice constant % | MHV (0.1) kgf/mm² | Volume loss mm³ |
|---|---|---|---|---|---|---|
| | | WC | $W_2C$ | | | |
| 1 | 0.01 | 0.40 | — | — | 2603 | 1.99 |
| 2 | 0.01 | 0.40 | — | — | 2823 | 1.29 |
| 3 | 0.015 | 0.40 | — | — | 2930 | 1.06 |
| 4 | 0.015 | 0.40 | 0.40 | 1.47 | 3051 | 0.85 |
| 5 | 0.015 | 0.40 | 0.40 | 1.15 | 3137 | 0.73 |
| 6 | 0.015 | 0.35 | 0.35 | 1.07 | 3274 | 0.58 |
| 7 | 0.015 | 0.35 | 0.35 | 0.61 | 3282 | 0.57 |
| 8 | 0.015 | 0.35 | 0.45 | 0.39 | 3145 | 0.72 |
| 9 | 0.015 | 0.40 | 0.60 | 0.24 | 2952 | 1.02 |
| 10 | 0.02 | 0.40 | 0.95 | 0.22 | 2721 | 1.57 |
| 11 | 0.015 | 0.35 | 0.35 | 1.04 | 3244 | 0.61 |
| 12 | 0.015 | 0.35 | 0.35 | 0.81 | 3269 | 0.59 |

Figure 2:
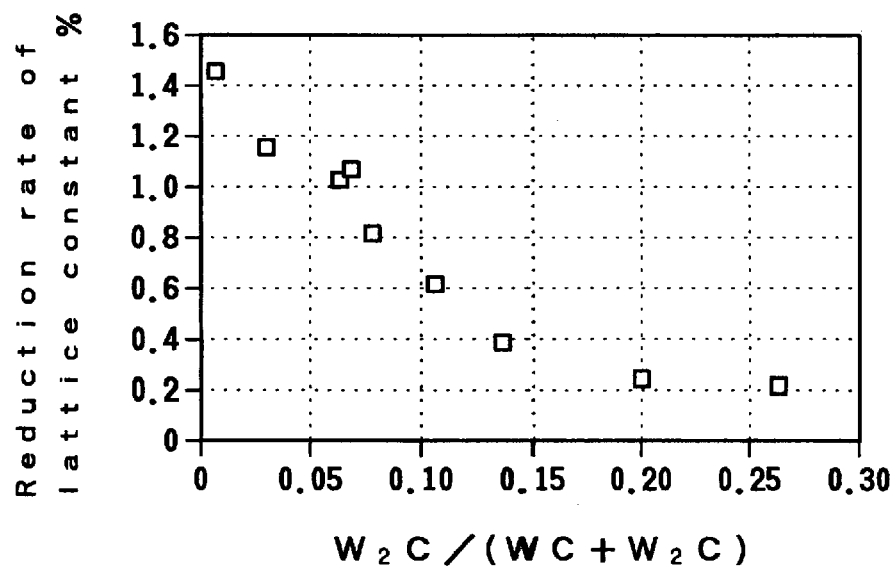
FIG. 2 is a graphical representation showing the relationship between $W_2C/(WC+W_2C)$ value and reduction rate of $W_2C$ lattice constant.
Figure 3:
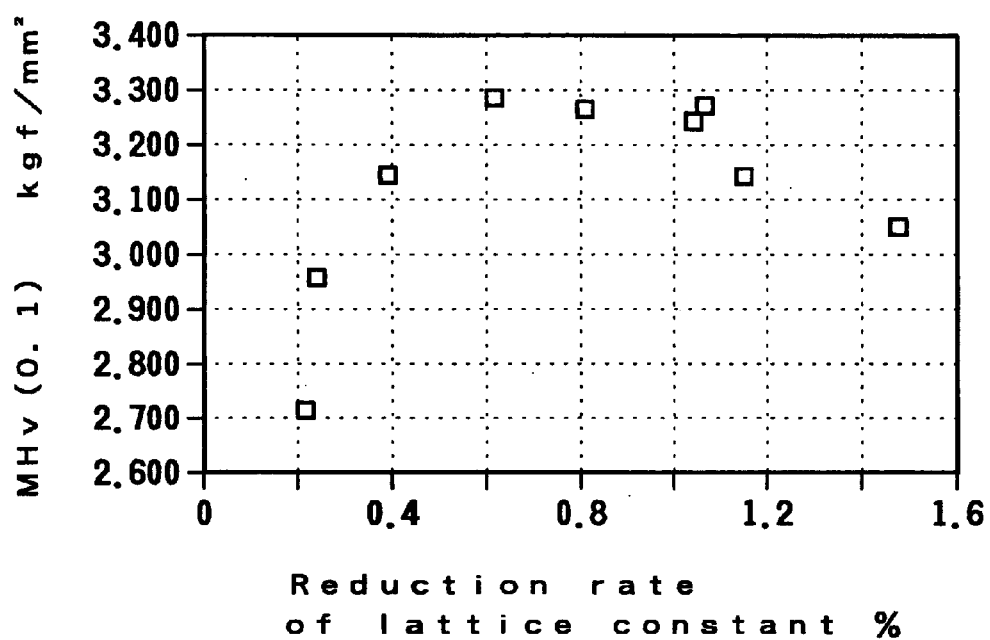
FIG. 3 is a graphical representation showing the relationship between reduction rate of $W_2C$ lattice constant and Micro-Vickers Hardness (MHv).

The following relationships are determined based on the data shown in Table 3 and illustrated in the following figures. That is, FIG. 1 is a graphical representation of the relationship between $W_2C/(WC+W_2C)$ value and Micro-Vickers Hardness (MHv); FIG. 2 a graphical representation of the relationship between $W_2C/(WC+W_2C)$ value and reduction rate of $W_2C$ lattice constant; and FIG. 3 a graphical representation of the relationship between reduction rate of $W_2C$ lattice constant and Micro-Vickers Hardness (MHv).

As can be seen from the figures, the materials of Examples 4 to 8, 11 and 12 having the $W_2C/(WC+W_2C)$ values of between 0.01 and 0.15 and satisfying the conditions of the invention are all improved in hardness and wear resistance, exhibiting hardnesses MHv(0.1) of over 3000 kgf/mm² and volume losses of below 1.0 mm³. On the other hand, the materials of Examples 1 and 2 containing a free carbon are significantly reduced in hardness due to the free carbon contained therein. The $W_2C$-free material of Example 3 is somewhat reduced in hardness whereas the materials of Examples 9 and 10 with $W_2C/(WC+W_2C)$ values of over 0.15 suffer an excessive grain growth of $W_2C$, exhibiting an average particle size of over 0.5 μm. All the materials of these Examples have hardnesses MHv(0.1) of less than 3000 kgf/mm² and volume losses of more than 1.0 mm³, thus comparing unfavorably in hardness and wear resistance with those of the examples satisfying the conditions of the invention.

The relationship between $W_2C/(WC+W_2C)$ value and reduction rate of $W_2C$ lattice constant shows that when the $W_2C/(WC+W_2C)$ value is in the range of between 0.01 and 0.15, the reduction rate of $W_2C$ lattice constant is also in the range of between 0.3 and 1.5%.

(EXAMPLES 13 to 25)

In Examples 13 to 18, resultant sintered hard materials contained the iron group metal(s) in varied amounts, respectively. Used as the ingredients therefor were WC powder having an average particle size of 0.2 μm and containing 6.21 wt % of carbon (C), and $Cr_3C_2$ and Co powders having average particle sizes of between 1.0 and 1.5 μm. In Examples 19 to 23, different types of carbides of transition metals of the Iva, Va and VIa groups of the periodic table were employed, as the ingredients, in different amounts, respectively. Used as the ingredients therefor were WC powder having an average particle size of 0.2 μm and containing 6.21 wt % of carbon (C), and $Cr_3C_2$, TaC, VC and Co powders having average particle sizes of between 1.0 and 1.5 μm. In Examples 24 and 25, the particle size of WC powder, as the ingredient, was varied. Used as the ingredients therefor were WC powder having an average particle size of 0.6 or 1.2 μm and $Cr_3C_2$ and Co powders having average particle sizes of between 1.0 and 1.5 μm.

The above ingredients for the respective Examples were mixed together in ratios as shown in the following Table 4. Similarly to the foregoing Examples 1 to 12, the resultant mixtures were each mixed by the ball mill for a period of time of 16 to 72 hours and then dried to give powder mixtures. It is to be noted here that for prevention of inadvertent addition of the iron group metal to the powder mixture during the mixing process, a Teflon-formed pot was used in Example 13 while a pot formed of a hard material was used in Example 14.

TABLE 4

| | WC ingredients | | | | | | |
|---|---|---|---|---|---|---|---|
| | Particle size | C content | Composition wt % | | | | |
| Examples | μm | wt % | WC | $Cr_3C_2$ | TaC | VC | Co |
| 13 | 0.2 | 6.21 | 99.00 | 1.00 | — | — | 0.00 |
| 14 | 0.2 | 6.21 | 99.00 | 1.00 | — | — | 0.00 |
| 15 | 0.2 | 6.21 | 98.99 | 1.00 | — | — | 0.01 |
| 16 | 0.2 | 6.21 | 98.94 | 1.00 | — | — | 0.06 |
| 17 | 0.2 | 6.21 | 98.91 | 1.00 | — | — | 0.09 |
| 18 | 0.2 | 6.21 | 98.88 | 1.00 | — | — | 0.12 |
| 19 | 0.2 | 6.21 | 99.97 | — | — | — | 0.03 |
| 20 | 0.2 | 6.21 | 98.97 | — | 1.00 | — | 0.03 |
| 21 | 0.2 | 6.21 | 97.97 | 1.00 | 1.00 | — | 0.03 |
| 22 | 0.2 | 6.21 | 98.97 | — | — | 1.00 | 0.03 |
| 23 | 0.2 | 6.21 | 97.47 | 3.50 | — | — | 0.03 |
| 24 | 0.6 | 6.16 | 98.97 | 1.00 | — | — | 0.03 |
| 25 | 1.2 | 6.11 | 99.97 | — | — | — | 0.03 |

After the grinding and abrasion works, the resultant parts of the above sintered hard materials were each subjected to similar measurements to those of Examples 1 to 13 for determination of density, contents of WC, $W_2C$, C, $Cr_3C_2$, TaC, VC and iron group metal in terms of wt %, and a $W_2C/(WC+W_2C)$ value. The results are shown in the following Table 5.

TABLE 5

| | Analysed composition wt % | | | | | | $W_2C/$ | |
|---|---|---|---|---|---|---|---|---|
| Examples | WC | $W_2C$ | $Cr_3C_2$ | TaC | VC | Iron group | $(WC+W_2C)$ | Density g/cm³ |
| 13 | 91.71 | 7.28 | 1.0 | — | — | 0.01 | 0.07 | 15.39 |
| 14 | 91.61 | 7.37 | 1.0 | — | — | 0.02 | 0.07 | 15.45 |
| 15 | 91.54 | 7.42 | 1.0 | — | — | 0.04 | 0.08 | 15.46 |
| 16 | 91.39 | 7.52 | 1.0 | — | — | 0.09 | 0.08 | 15.47 |
| 17 | 91.32 | 7.56 | 1.0 | — | — | 0.12 | 0.08 | 15.48 |
| 18 | 91.28 | 7.56 | 1.0 | — | — | 0.16 | 0.08 | 15.48 |
| 19 | 92.44 | 7.50 | — | — | — | 0.06 | 0.08 | 15.50 |
| 20 | 91.42 | 7.52 | — | 1.0 | — | 0.06 | 0.08 | 15.66 |
| 21 | 90.55 | 7.39 | 1.0 | 1.0 | — | 0.06 | 0.08 | 15.57 |
| 22 | 91.42 | 7.52 | — | — | 1.0 | 0.06 | 0.08 | 15.43 |
| 23 | 90.08 | 7.36 | 3.5 | — | — | 0.06 | 0.08 | 15.19 |
| 24 | 91.47 | 7.47 | 1.0 | — | — | 0.06 | 0.08 | 15.45 |
| 25 | 99.94 | — | — | — | — | 0.06 | — | 15.52 |

The sintered hard materials of these Examples were also subjected to similar measurements to those of the foregoing Examples 1 to 12 for determination of the respective void volumes, reduction rates of $W_2C$ lattice constant, Micro-Vickers 100 g hardnesses MHv(0.1), and volume losses thereof. The results are shown in the following Table 6.

TABLE 6

| | Void volume | Particle size μm | | Reduction rate of lattice constant | MHV (0.1) | Volume loss |
|---|---|---|---|---|---|---|
| Examples | vol % | WC | $W_2C$ | % | kgf/mm² | mm³ |
| 13 | 0.06 | 0.35 | 0.40 | 1.08 | 2845 | 1.24 |
| 14 | 0.02 | 0.35 | 0.40 | 1.09 | 3010 | 0.92 |
| 15 | 0.015 | 0.35 | 0.35 | 1.01 | 3123 | 0.75 |
| 16 | 0.01 | 0.45 | 0.45 | 0.97 | 3090 | 0.80 |
| 17 | 0.01 | 0.55 | 0.65 | 0.86 | 2900 | 1.12 |
| 18 | 0.01 | 0.70 | 0.75 | 0.83 | 2818 | 1.31 |
| 19 | 0.01 | 0.60 | 0.70 | 0.92 | 2897 | 1.12 |
| 20 | 0.015 | 0.45 | 0.45 | 0.93 | 3024 | 0.89 |
| 21 | 0.015 | 0.35 | 0.40 | 0.94 | 3123 | 0.75 |
| 22 | 0.015 | 0.35 | 0.35 | 0.97 | 3205 | 0.65 |
| 23 | 0.04 | 0.35 | 0.40 | 0.99 | 2914 | 1.09 |
| 24 | 0.02 | 0.90 | 1.05 | 0.64 | 2598 | 2.01 |
| 25 | 0.04 | 2.50 | 2.95 | — | 1854 | 22.84 |

As can be seen from the table, among the materials of Examples 13 to 18, those of Examples 14 to 16 satisfying the conditions of the invention and having a content of the iron group metal ranging from 0.02 to 0.10 wt % and an average particle sizes of WC and $W_2C$ of not greater than 0.5 μm, respectively, are all improved in hardness and wear resistance, exhibiting hardnesses MHv(0.1) of not less than 3000 kgf/mm² and volume losses of not greater than 1.0 mm³. On the other hand, the material of Example 13 containing less than 0.02 wt % of the iron group metal exhibits an increased void volume of 0.06 vol % whereas the materials of Examples 17 and 18 containing more than 0.10 wt % of the iron group metal exhibit average particle sizes of more than 0.5 μm because of excessive grain growth of WC and $W_2C$ particles. All the materials of the latter three examples have hardnesses MHv(0.1) of less than 3000 kgf/mm² and volume losses of more than 1.0 mm³, thus comparing unfavorably in hardness and wear resistance with those of the examples satisfying the conditions of the invention.

Among the materials of Examples 19 to 23, those of Examples 20 to 22 satisfying the conditions of the invention and containing 0.3 to 3.0 wt % of $Cr_3C_2$, $C_2$, TaC and/or VC are all improved in hardness and wear resistance, exhibiting hardnesses MHv(0.1) of more than 3000 kgf/mm² and volume losses of less than 1.0 mm³. In contrast, the material of Example 19 free from $Cr_3C_2$, TaC and VC exhibits an average particle size of more than 0.5 μm because of excessive grain growth of WC and $W_2C$ particles whereas the material of Example 23 containing more than 3.0 wt % of $Cr_3C_2$ is not only reduced in hardness but also in sinterability because of the excessive amount of $Cr_3C_2$. Both the materials of Examples 19 and 23 have hardnesses MHv(0.1) of less than 3000 kgf/mm² and volume losses of more than 1.0 mm³, thus comparing unfavorably in hardness and wear resistance with those of the examples satisfying the conditions of the invention.

In Examples 24 and 25 employing WC powder, as the ingredient, with relatively large average particle sizes of 0.6 μm and 1.2 μm, respectively, both the resultant sintered materials have hardnesses MHv(0.1) of less than 3000 kgf/mm² and volume losses of more than 1.0 mm³, thus comparing unfavorably in hardness and wear resistance with those of the examples satisfying the conditions of the invention.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A sintered hard material comprising 0.02 to 0.10 wt % of one or more metals selected from the group consisting of Fe, Co and Ni, 0.3 to 3.0 wt % of one or more compounds selected from the group consisting of carbides, nitrides and carbonitrides of transition metals of the IVa, Va and VIa groups of the periodic table and a residue of tungsten carbide component having an average particle size of 0.5 μm or less, the tungsten carbide component containing WC and $W_2C$ in a proportion $W_2C/(WC+W_2C)$ of between 0.01 and 0.15.

2. A sintered hard material as claimed in claim 1, wherein 0.6 to 2.0 wt % of chromium carbide is contained as one compound selected from said group consisting of carbides, nitrides and carbonitrides of the transition metals of the IVa, Va and VIa groups of the periodic table.

3. A sintered hard material as claimed in claim 1, featuring a void volume of not more than 0.02 vol %.

4. A sintered hard material as claimed in claim 1, featuring a Micro-Vickers Hardness of not less than 3000 $kgf/mm^2$ measured using a hundred gram load.

5. A sintered hard material comprising 0.02 to 0.10 wt % of one or more metals selected from the group consisting of Fe, Co and Ni, 0.3 to 3.0 wt % of one or more compounds selected from the group consisting of carbides, nitrides and carbonitrides of transition metals of the IVa, Va and VIa groups of the periodic table and a residue of tungsten carbide component having an average particle size of 0.5 μm or less, the tungsten carbide component containing $W_2C$ having a lattice constant reduced by 0.3 to 1.5%.

6. A sintered hard material as claimed in claim 5, wherein 0.6 to 2.0 wt % of chromium carbide is contained as one compound selected from said group consisting of the transition metals of the IVa, Va and VIa groups of the periodic table.

7. A sintered hard material as claimed in claim 5, featuring a void volume of not more than 0.02 vol %.

8. A sintered hard material as claimed in claim 5, featuring a Micro-Vickers Hardness of not less than 3000 $kgf/mm^2$ measured using a hundred gram load.

* * * * *